Jan. 4, 1944.  E. E. HAYES  2,338,244
MOTOR VEHICLE
Filed March 3, 1941  2 Sheets-Sheet 1
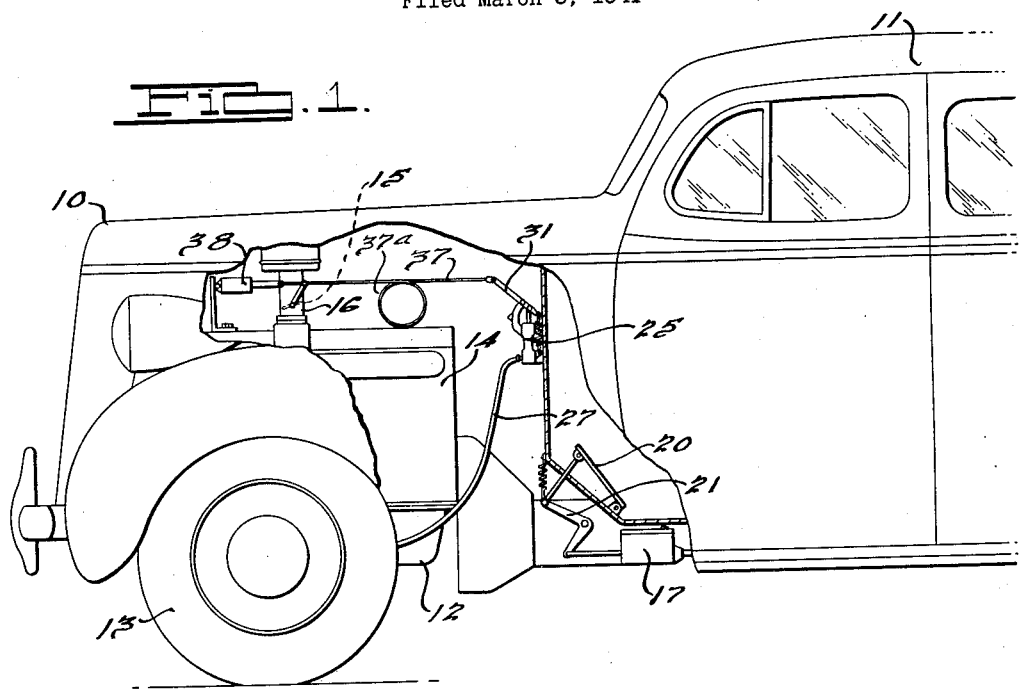
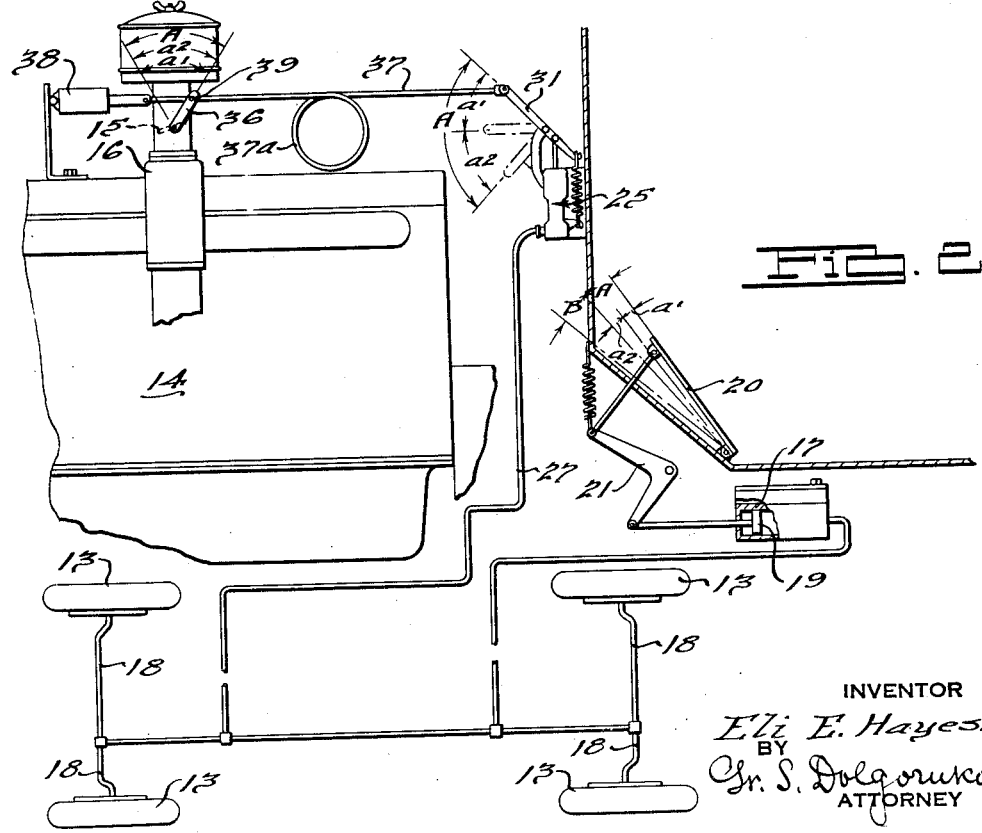
INVENTOR
Eli E. Hayes.
BY
Gr. S. Dolgoruko
ATTORNEY Jan. 4, 1944.  E. E. HAYES  2,338,244
MOTOR VEHICLE
Filed March 3, 1941  2 Sheets-Sheet 2

INVENTOR
Eli E. Hayes.
BY
Gr. S. Dolgoruky
ATTORNEY

Patented Jan. 4, 1944

2,338,244

UNITED STATES PATENT OFFICE 2,338,244

MOTOR VEHICLE

Eli E. Hayes, Detroit, Mich.

Application March 3, 1941, Serial No. 381,513

19 Claims. (Cl. 192—3)

This invention relates to vehicles and more particularly to motor propelled vehicles, such as automobiles and the like. The invention has a particular reference to motor and brake control systems of such vehicles.

In present day motor vehicles, such as automomiles, speed control of a vehicle is usually attained with the aid of a throttle valve of the vehicle engine, which valve is manually operated, usually with the aid of a foot pressed pedal commonly referred to as "the accelerator pedal." Pressing the pedal down operates to increase the speed of the engine and consequently of the vehicle, while releasing said pedal permits a spring to return said pedal to its initial position corresponding to the "idling speed" of the engine. Stopping of the vehicle is effected with the aid of brakes acting on the vehicle wheels and usually operated hydraulically or pneumatically through a second foot pedal commonly referred to as "the brake pedal." Both the brake and the accelerator pedals are operated with the aid of the right foot of the driver, and for stopping the vehicle it is necessary to remove the right foot from the accelerator pedal, bend the right leg at the knee, move the entire leg to the left by using the muscles of the leg, hip and part of the abdomen, place the foot on the brake pedal, and press it down for application of brakes.

It has been found by experience that the time of human reaction to visual danger together with the time necessary to move the foot from the accelerator pedal to the brake pedal aggregates to a period of about one second, and sometimes considerably longer. On the other hand, a motor vehicle travelling at a speed of thirty miles per hour, now quite common even within city limits, moves in one second through a distance of about forty-four feet. While the average motor vehicle travelling at the above speed may be stopped within a distance of about fifty feet from the place where the brakes were actually applied, the entire distance through which the motor vehicle moving at the speed specified may travel from the beginning of the stopping operation until the full stop usually reaches one hundred feet, in which total distance the large portion thereof is produced by the parasitic non-operation time necessary for the physiological reaction and actual moving of the right foot from the accelerator pedal to the brake pedal. Many serious traffic accidents may be traced to the above described cause, and elimination of the above "parasitic distance" is undoubtedly a serious measure toward improving the safety of motor vehicle travel. In addition, many accidents have been caused by the operator pressing by mistake the accelerator pedal instead of the brake pedal missed in the short period of emergency and excitement.

One of the objects of the present invention is to provide an improved motor vehicle in which the above described disadvantages are overcome and largely eliminated and which may be operated in heavy and relatively fast traffic with a greater degree of safety.

Another object of the present invention is to provide an improved motor vehicle in which the number of control pedals is decreased and the vehicle may be controlled in a simpler manner eliminating possibility of operating a wrong pedal when the operator is confused.

A further object of the present invention is to provide an improved motor vehicle in which means are provided whereby the time necessary for the vehicle operator for transferring his foot from the accelerator pedal to the brake pedal in cases of emergency stops is eliminated and the time necessary for application of brakes is made exceedingly short.

A further object of the present invention is to provide an improved motor vehicle in which conventional accelerator and brake pedals are eliminated and operation of the brakes as well as control of the throttle valve of the vehicle engine is attained with the aid of a single pedal.

A further object of the invention is to provide an improved motor vehicle in which means are provided whereby application of brakes may be effected by the vehicle operator without removing his foot from the control pedal.

A still further object of the invention is to provide an improved motor vehicle in which means are provided whereby operation of the throttle valve and the brakes may be effected from a single pedal not only without introducing additional complicated devices and mechanisms, but on the contrary, by using in a slightly modified form the devices usually provided in conventional vehicles and even eliminating certain parts thereof and simplifying others.

A still further object of the present invention is to provide an improved motor vehicle having a throttle valve and brakes operated by a single pedal, means being provided to prevent operation of the brakes when the throttle valve is being operated and also to prevent objectionable opening of the throttle valve when the brakes are suddenly applied.

A still further object of the present invention is to provide an improved motor vehicle in which means are provided whereby failure of fluid pressure in the brake operating system is immediately indicated by the throttle valve.

A still further object of the present invention is to provide an improved motor vehicle having simplified controls and in which the natural behavior or involuntary impulse of a terror stricken human body, namely straightening of the body and stiffening of the muscles thereof, are utilized to stop the vehicle in an emergency without the necessity of preconceived movements.

It is an added object of the present invention to provide an improved structure of the foregoing character which is simple in construction, safe and dependable in operation, and relatively inexpensive to manufacture, service and repair.

Other objects of this invention will appear in the following description and appended claims, reference being had to the accompanying drawings forming a part of this specification wherein like reference characters designate corresponding parts in the several views.

Fig. 1 illustrates a portion of a motor vehicle embodying the present invention, parts of the motor vehicle structure being cut out to show the construction of the device more clearly.

Fig. 2 is a diagrammatic view illustrating my improved brake and throttle valve control device and its connection with the vehicle brake operating system.

Figures 3, 4:
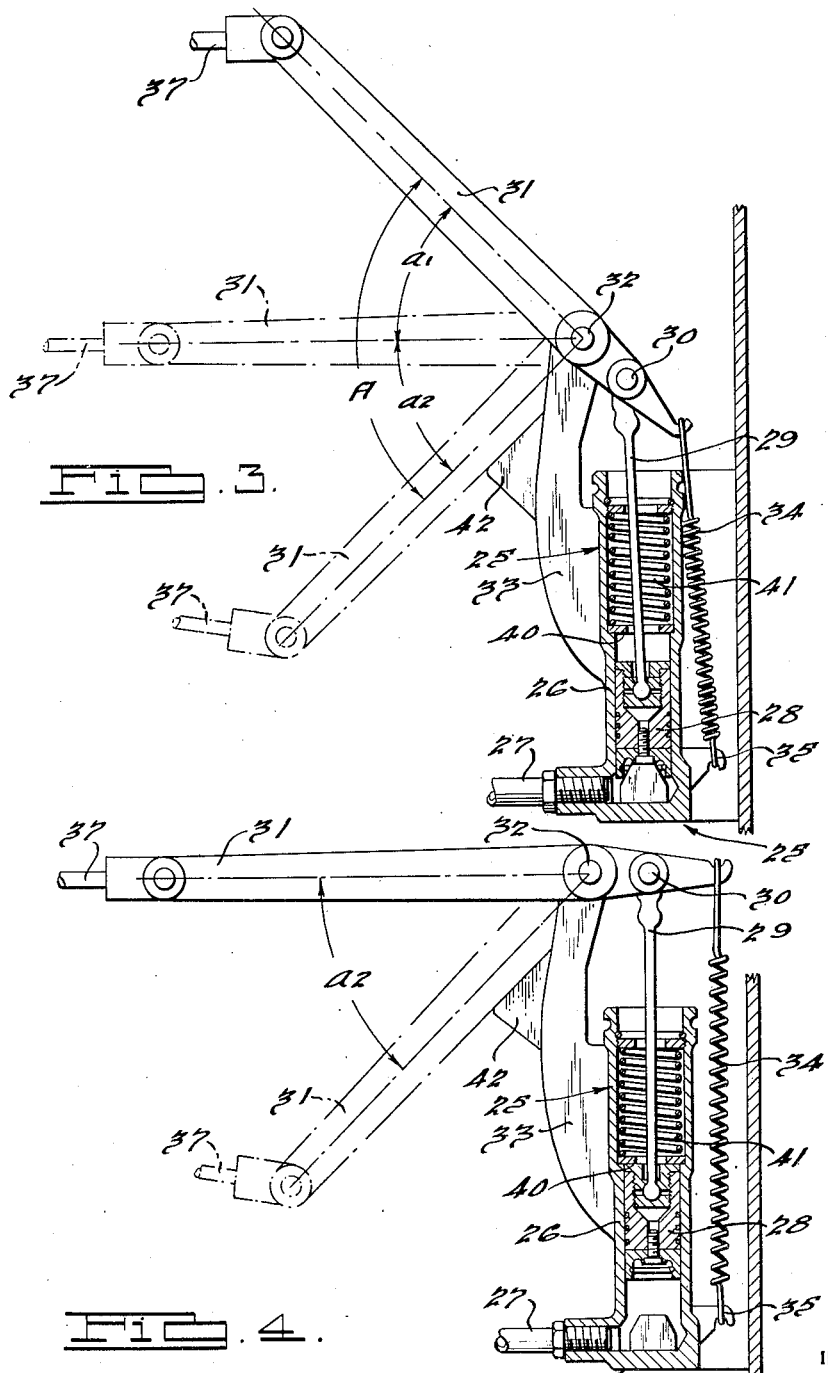
Fig. 3 is a view illustrating separately the control cylinder and the crank operated thereby, said crank being shown in a position corresponding to the closed position of the throttle valve.
Fig. 4 is a view similar in part to Fig. 3, the parts of the control cylinder being shown in positions corresponding to the fully open position of the throttle valve.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art. Particularly, in referring to positions of the throttle valve of the engine the terms "closed" and "open" positions of the throttle valve are to be understood respectively as substantially closed position of the throttle valve corresponding to the idling speed of the engine, and substantially fully open position thereof corresponding to operation conditions of the engine at which the same develops its maximum torque.

Referring to the drawings and particularly to Figs. 1 and 2 thereof, 10 designates a motor vehicle embodying the present invention. Said vehicle 10 comprises a body 11 and a chassis 12. The chassis 12 comprises, in turn, a running gear including wheels 13 provided with suitable brakes, preferably hydraulically operated, and an engine 14 operatively mounted on said chassis. The engine 14 is controlled by a throttle valve 15 operatively mounted in the intake passage 16 of the engine. The brakes of the wheels 13 are operated through a hydraulic system including a master cylinder 17 and a plurality of liquid conducting conduits 18 leading to each of the wheels 13. Within the master cylinder 17 there is slidably fitted a piston 19 adapted to exert a force on the liquid in said cylinder and thus to create pressure in said hydraulic system.

The structure so far described is a conventional one, and details thereof are well known in the art. For this reason no more detailed explanations are deemed necessary, since it is believed that the same would obscure rather than clarify the invention. It will be understood that the present invention is hereinafter described and is illustrated in the drawings as applied to a motor vehicle having a hydraulic system for operating the brakes. However, my invention may be applied with equal success to vehicles of other types as well as to motor vehicles having brakes operated with means of different types or with fluids other than liquids, such for instance as to motor vehicles with pneumatic or air brakes.

In accordance with the invention there is provided a pedal 20 adapted to be operated by the operator's right foot, which pedal is connected through a bell crank 21 with the piston 19 of the master cylinder 17. As the pedal 20 is pressed and moves downwardly, the piston 19 moves to the right and creates hydraulic pressure in the system substantially in proportion to the force exerted on the pedal 20, resulting in proportional downward travel of said pedal. In the brake drums provided at each of the wheels 13 there are provided hydraulically operated means such as cylinders with pistons acting on the brake drums. The action of the brake fluid on the brake drum pistons (not shown) is resisted by suitable springs having initial tension of about eighty pounds. Thus until the pressure in the hydraulic system reaches said predetermined pressure of about eighty pounds, the springs (not shown) will resist operation of the brakes, and therefore pressures in the hydraulic system below said predetermined pressure of about eighty pounds are inoperative to operate the brakes. Thus it may be stated that there are created in the hydraulic system two stages of pressures, namely the low pressure stage and the high pressure stage. In the low pressure stage the fluid pressure in the system is incapable of operating the brakes, while it is only in the high pressure stage that the brakes begin operating. Since the pressure in the hydraulic system may be considered as being substantially proportional to the degree of the downward travel of the pedal, it may be further stated that within the initial or the first portion of its downward travel, the pedal 20 is incapable of operating the brakes and it is only after it reaches a certain point on its downward travel, or travels through the entire angle A, see Fig. 2, that it comes to a position after which operation of the brakes begins.

In accordance with the invention means are provided whereby the throttle valve 15 is operated by the pedal 20 in response to its travel through the angle A or while the pressure in the hydraulic system is in its low stage. In the present embodiment of the invention said means are exemplified by a control cylinder generally indicated by the numeral 25 and comprising a cylinder body 26 hydraulically connected through a conduit 27 with the hydraulic system communicating with the master cylinder 17. In the cylinder body 26 there is slidably fitted a piston 28 hingedly connected by a rod 29 as at 30 with a crank 31. The crank 31 is hinged at 32 in a bracket 33 provided on the cylinder body 26. One end of the crank 31 is connected to a tension spring 34 anchored on the cylinder body 26 as shown at 35. The opposite end of the crank 31 is connected mechanically with a lever 36 of the throttle valve 15.

Thus the connection of the throttle valve 15 and the pedal 20 is in part hydraulic and in part mechanical. The mechanical connection between the crank 31 and the throttle valve 15 includes a spring rod 37 made of material such as a piano wire and having a loop 37a formed thereon. The material of the rod 37 is so selected that it is stiff enough to transmit throttle valve operating force normally exerted. However, when such force is applied suddenly, the loop 37a yields to the impact force and unbends, thus failing to transmit the opening force to the throttle valve 15. This operation of the loop 37a is assisted still further by means which resist sudden opening of the throttle valve 15. In the present embodiment of the invention said means are exemplified by a dashpot 38 of any suitable construction, which dashpot is connected to the lever 36 as illustrated at 39.

The initial tension of the spring 34 is rather weak and is preferably about seven or eight pounds. Thus until the pressure in the hydraulic system reaches a pressure sufficient to cause the crank 31 to exert the pressure of seven pounds on the spring 34 no movements of the throttle valve 15 will occur in response to the movements of the pedal 20. By this means undesirable movements or fluctuations of the throttle valve because of vibrations or incidental movements of the pedal 20 are prevented. When, however, the pressure in the hydraulic system reaches said minimum pressure which occurs only when the operator intentionally presses the pedal 20 down, the crank 31 begins moving downwardly through the angle $a'$ reaching the end thereof substantially when the pressure in the system reaches a point when a force of about fifteen pounds is exerted on the spring 34. At this position of the crank 31 shown in dotted lines in Fig. 3 and in solid lines in Fig. 4, the throttle valve 15 is in its fully open position and the engine is delivering its maximum torque. Thus within the angle $a'$ the throttle valve 15 moves in response to the operation of the pedal 20, according to the depression or release of it by the operator.

As illustrated in Fig. 4, when the crank 31 reaches its position shown in solid lines in said Fig. 4, the piston 28 contacts a washer 40 acting on the compression spring 41, which spring is mounted in the cylinder body 26 and is adapted to be compressed therein by said piston in the upward movement thereof. The spring 41 is relatively stiff and is initially compressed by a force of about sixty pounds. Thus when the crank 31 reaches its position shown in solid lines in Fig. 4, it requires a considerably greater force to be applied to the pedal 20 to overcome resistance of said spring. When the spring 41 is reached abruptly, it gives to the operator a feeling that the pedal 20 has reached the end of its travel for opening the throttle valve 15.

When operating the brakes becomes necessary, the same is usually achieved with a strong and quick movement of the right leg. When strong depressing force is applied by the operator on the pedal 20, the crank 31 starts moving through the angle $a^2$ compressing the spring 41. Since the application of said force is sudden, the piano wire connection 37 and the dashpot 38 prevent appreciable further opening of the throttle valve 15. When the crank 31 reaches the position indicated in Fig. 4 by the dotted lines, it reaches a stop 42. Such movement of the crank 31 operates to move the lever 36 to close the throttle valve. This causes the loop 37a to be put in its initial condition. Therefore, opening of the throttle valve because of the possible gradual transmission of force through the piano wire 37 is prevented, and the throttle valve 15 is brought to its closed position.

When the crank 31 reaches the stop 42, the pedal 20 has reached the end of its travel in the angle A, and the pressure in the system reaches the point where brake springs are incapable to resist it. Therefore, further travel of the pedal 20 into and through the angle B causes operation of the brakes in response to the travel of the pedal 20.

It will now be clear in view of the foregoing that travel of the pedal 20 through the angle $a'$, being resisted by the above described spring means, has a tendency to have its deflection proportional to forces exerted thereon, thus approximately following Hook's law. Such proportionality also exists in the angle $a^2$, although the numerical value thereof is different, since the same is changed by the additional resistance of the spring 41. At the end of the angle $a^2$ or A when the pedal is about to move into the angle B, the pressure is increased about 300% without any pedal travel, since the liquid is substantially incompressible. Through the angle B the travel of the pedal is proportional to the foot pressure exerted thereon until the brake shoes actually engage the brake drums.

Referring to Fig. 2, it can be seen that the crank member 31 moves with the pedal 20 only through the angles $a'$ and $a^2$ forming the larger angle A, but remains stationary at the end of angle A when the pedal moves in the angle B. It should also be noted that as shown in Fig. 2, with reference to throttle lever 36 the angles $a'$, $a^2$ and A are equal and they coincide with one another.

When the pedal 20 after being fully depressed for application of brakes is released, it returns through the angles B and A to the idling position by the successive and in part combined action of the above described spring means.

Thus, there are provided means whereby the throttle valve 15 is operated in response to the movements of the pedal 20 within the angle $a'$ and is closed by the movements thereof through the angle $a^2$, both of said angles $a'$ and $a^2$ forming the larger angle A through which the pedal 20 moves for moving the throttle valve 15. Movements of said pedal through said angle A are inoperative to actuate the brakes. On the other hand, when the pedal is further depressed and moves in the angle B, its movements therein operate to actuate the brakes but are inoperative to actuate the throttle valve.

Therefore, in my improved motor vehicle the pedal 20 represents a single control for both the throttle valve 15 and the brakes of the wheels 13, and it operates the throttle valve through one portion of its downward travel and the brakes through the other portion thereof. By virtue of such a construction, disadvantages of the conventional structures explained above are overcome and largely eliminated and objects of the present invention together with numerous incidental advantages are attained.

I claim:

1. In a vehicle having an engine, a throttle valve controlling said engine, brakes for slowing down and stopping said vehicle, a hydraulic system adapted to operate said brakes when pressure therein reaches a predetermined point, a single pedal operatively connected with said system and adapted to create hydraulic pressure therein substantially in proportion to the extent of its downward travel, a hydraulically actuated member responsive to pressures in said system below said predetermined point, and mechanical connection between said member and said throttle valve to operate said throttle valve in response to the movements of said pedal when the pressure in said system is below said predetermined point, said mechanical connection being adapted to close said throttle valve before said pressure reaches said predetermined point.

2. In a vehicle having an engine, a throttle valve controlling said engine, brakes for slowing down and stopping said vehicle, a hydraulic system adapted to operate said brakes when pressure therein reaches a predetermined point, a pedal operatively connected with said system and adapted to create hydraulic pressure therein substantially in proportion to the extent of its downward travel, a hydraulically actuated member responsive to pressures in said system below said predetermined point, and mechanical connection between said member and said throttle valve to operate said throttle valve in response to the movements of said pedal when the pressure in said system is below said predetermined point, said mechanical connection including a crank operated by said member and adapted to move through a predetermined angle for moving said throttle valve from its idling position to its fully open position when moving through the first portion of said angle, and from its fully open position to its idling position when moving through the second portion of said angle.

3. In a vehicle having an engine, a throttle valve controlling said engine, brakes for slowing down and stopping said vehicle, a hydraulic system adapted to operate said brakes when pressure therein reaches a predetermined point, a pedal operatively connected with said system and adapted to create hydraulic pressure therein substantially in proportion to the extent of its downward travel, a hydraulically actuated member responsive to pressures in said system below said predetermined point, and mechanical connection between said member and said throttle valve to operate said throttle valve in response to the movements of said pedal when the pressure in said system is below said predetermined point, said mechanical connection including a crank operated by said member and adapted to move through a predetermined angle for moving said throttle valve from its idling position to its fully open position when moving through the first portion of said angle, and from its fully open position to its idling position when moving through the second portion of said angle, yielding means resisting movement of said crank particularly through the first portion of said angle, and means providing additional resistance to the movement of said crank into the second portion of said angle, the resistance of both of said means being so selected that the predetermined pressure necessary to operate the brakes brings said crank to the end of said entire angle of its movement.

4. In a vehicle having an engine, a throttle valve controlling said engine, hydraulic brakes for slowing down and stopping said vehicle, said brakes adapted to begin operating at a certain predetermined hydraulic pressure, a hydraulic system having a master cylinder, a single pedal connected to said master cylinder and adapted to create pressure therein, a hydraulic pressure transmitting connection between said master cylinder and said brakes, a control cylinder hydraulically connected to said master cylinder, a piston in said control cylinder responsive to the pressures therein below said predetermined pressure at which the brakes begin operating, said piston being operatively connected to said throttle valve to operate the same in response to the pressure producing movements of said pedal until the pressure reaches said predetermined point.

5. In a vehicle having an engine, a throttle valve controlling said engine, hydraulic brakes for slowing down and stopping said vehicle, said brakes adapted to begin operating at a certain predetermined hydraulic pressure, a hydraulic system having a master cylinder, a single pedal connected to said master cylinder to create pressure therein, a hydraulic pressure transmitting connection between said master cylinder and said brakes, a control cylinder hydraulically connected to said master cylinder, a piston in said control cylinder responsive to the pressures therein below the predetermined pressure at which the brakes begin operating, said piston being mechanically connected to said throttle valve to operate the same in response to gradual pressure producing movements of said pedal until the pressure in said master cylinder reaches said predetermined point.

6. In a vehicle having an engine, a throttle valve controlling said engine, hydraulic brakes for slowing down and stopping said vehicle, said brakes adapted to begin operating at a certain predetermined hydraulic pressure, a hydraulic system having a master cylinder, a single pedal connected to said master cylinder and adapted to create pressure therein, a hydraulic pressure transmitting connection between said master cylinder and said brakes, a control cylinder hydraulically connected to said master cylinder, a piston in said control cylinder responsive to the pressures therein below the predetermined pressure at which the brakes begin operating, a connection between said piston and said throttle valve to operate said valve in response to pressure producing movements of said pedal until the pressure in said system reaches said predetermined point, said connection being adapted to become inoperative to open said valve appreciably when the pedal is applied abruptly and the pressure in said system rises suddenly.

7. In a vehicle having an engine, a throttle valve controlling said engine, hydraulic brakes for slowing down and stopping said vehicle, said brakes adapted to begin operating at a certain predetermined hydraulic pressure, a hydraulic system having a master cylinder, a single foot operated pedal connected to said master cylinder and adapted to create pressure therein, a hydraulic pressure transmitting connection between said master cylinder and said brakes, a control cylinder hydraulically connected to said master cylinder, a piston in said control cylinder responsive to the pressures therein below the predetermined pressure at which the brakes begin operating, a mechanical connection between said piston and said throttle valve to operate said valve in response to pressure producing movements of said pedal until the pressure in said system reaches said predetermined point, said mechanical connection including a member yielding to application of a sudden force in order to prevent appreciable opening of said throttle valve when said pedal is suddenly applied to stop the vehicle.

8. In a vehicle having an engine, a throttle valve controlling said engine, hydraulic brakes for slowing down and stopping said vehicle, said brakes adapted to begin operating at a certain predetermined hydraulic pressure, a hydraulic system having a master cylinder, a single pedal connected to said master cylinder and adapted to create pressure therein, a hydraulic pressure transmitting connection between said master cylinder and said brakes, a control cylinder hydraulically connected to said master cylinder, a piston in said control cylinder responsive to the pressures therein below the predetermined pressure at which the brakes begin operating, a mechanical connection between said piston and said throttle valve to operate said valve in response to pressure producing movements of said pedal until the pressure in said system reaches said predetermined point, said mechanical connection including a member yielding to a suddenly applied force, and means connected to said throttle valve for increasing the resistance thereof to sudden openings, whereby appreciable opening of said throttle valve when said pedal is suddenly applied for stopping the vehicle is prevented.

9. In a vehicle having an engine, a throttle valve controlling said engine, brakes for stopping and slowing down said vehicle, a hydraulic system for actuating said brakes, a single pedal operatively connected to said throttle valve and said brakes and adapted to operate said valve through one predetermined portion of its travel and said brakes through another predetermined portion thereof, the operative connection between said pedal and said throttle valve being achieved in part hydraulically through the brake operating hydraulic system, whereby failure of hydraulic pressure in said brake operating hydraulic system manifests immediately by making said throttle valve inoperative.

10. In a vehicle having an engine, a throttle valve controlling said engine, brakes for slowing down and stopping said vehicle, a single fluid system for operating said throttle and said brakes, a single pedal operatively connected with said system for creating fluid pressure therein and adapted to operate said valve through one predetermined portion of its travel and said brakes through another predetermined portion of its travel in the same general direction.

11. In a vehicle having an engine, a throttle valve controlling said engine, brakes for slowing down and stopping said vehicle, a single fluid system for operating said throttle and said brakes, a single pedal operatively connected with said system for creating fluid pressure therein and adapted to open said valve while moving through one predtermined portion of its travel, to close said valve while moving through the successive portion of its travel in the same general direction, and to apply said brakes while moving in the next successive portion of its travel in the same general direction.

12. In a vehicle having an engine, a throttle valve controlling said engine, a crank member having a predetermined travel and operatively connected to said valve for actuating the same, said crank member being adapted to be opening said valve during the first portion of its travel and to be closing said valve during the second portion of its travel in the same general direction, a hydraulic control cylinder, a piston slidably fitted in said cylinder and operatively connected to said crank member for operating the same, two springs of different deflection rates associated with said cylinder and adapted to create different resistance to movement of said crank through said portions of its travel.

13. In a vehicle having an engine, a throttle valve controlling said engine, hydraulically operated brakes for slowing down and stopping said vehicle, a crank member having a predetermined travel and operatively connected to said valve for actuating the same, said crank member being adapted to be opening said valve during the first portion of its travel and to be closing said valve during the second portion of its travel in the same general direction, a hydraulic control cylinder, a piston slidably fitted in said cylinder and operatively connected to said crank member for operating the same, two springs of different deflection rates associated with said cylinder and adapted to create different resistance to movements of said crank through said portions of its travel, a hydraulic master cylinder having a slidable piston, a foot operated member operatively connected to said piston for actuating the same, a hydraulic pressure transmitting connection between said master cylinder and said control cylinder and forming in part a hydraulic pressure transmitting connection between said master cylinder and said brakes, and spring means for said brakes resisting their application and having resistance greater than the combined resistance of said two springs.

14. In a vehicle having an engine, a throttle valve controlling said engine, hydraulically operated brakes for slowing down and stopping said vehicle, a crank member having a predetermined travel and operatively connected to said valve for actuating the same, said crank member being adapted to be opening said valve during the first portion of its travel thus controlling the engine and to be closing said valve during the second portion of its travel in the same general direction, a hydraulic control cylinder, a piston fitted in said cylinder and operatively connected to said crank member for operating the same, two springs of different deflection rates associated with said cylinder and adapted to create different resistance to movements of said crank through said portions of its travel, a hydraulic master cylinder having a slidable piston, a foot operated member operatively connected to said piston for actuating the same, a hydraulic pressure transmitting connection between said master cylinder and said control cylinder and forming in part a hydraulic pressure transmitting connection between said master cylinder and said brakes, and spring means for said brakes having resistance greater than the combined resistance of said two springs, and stop means for said crank member at the end of the second portion of its travel adapted to support said crank member against hydraulic pressure when the brakes are being operated.

15. In a vehicle having an engine, a throttle valve controlling said engine, brakes for stopping and slowing down said vehicle, a single hydraulic system for actuating said brakes and said valve, a single pedal adapted to create hydraulic pressure in said system substantially in proportion to its travel, a relatively light spring resisting moving of said pedal through the first portion of its travel, a second spring stiffer than said first spring and adapted to resist moving of said pedal through the second portion of its travel, and spring means acting on said brakes and adapted to oppose their operation, said last spring means being stiffer than said first two springs, all of said springs being adapted to be overcome by the hydraulic pressure in said system, whereby three pressure stages are successively created in said system as said pedal is moved in one direction through its entire operative stroke, means responsive to said first pressure stage and adapted to be opening the throttle valve for operatively controlling the engine, said last means being also responsive to the second pressure stage for closing said throttle valve when the brakes are about to be applied, and means responsive to said third stage and adapted to operate said brakes.

16. In a vehicle having an engine, a throttle valve controlling said engine, hydraulically actuated brakes for slowing down and stopping said vehicle, a single hydraulic system including a single master cylinder having a piston, a single foot operated pedal operatively connected to said piston for creating pressure therein, a control cylinder having a hydraulically actuated piston operatively connected to said valve for opening and closing the same, hydraulic pressure transmitting connections interconnecting said master cylinder, said control cylinder and said brakes for constant transmission of hydraulic pressure therebetween, said brakes being responsive to higher degree of hydraulic pressure than said control cylinder.

17. In a vehicle having an engine, a throttle valve controlling said engine, hydraulically actuated brakes for slowing down and stopping said vehicle, a single hydraulic system including a single master cylinder having a piston, a single foot operated pedal operatively connected to said piston for creating pressure therein, a control cylinder having a hydraulically actuated piston operatively connected to said valve for controlling the same, hydraulic pressure transmitting connections interconnecting said master cylinder, said control cylinder and said brakes for constant transmission of hydraulic pressure therebetween, two stage spring means associated with said control cylinder and third stage spring means associated with said brakes, said spring means adapted to resist yieldingly hydraulic pressure in said system and thus to create three pressure stages therein offering three degrees of pressure to the movement of said pedal during one full pressure creating stroke thereof.

18. In a vehicle having an engine, a throttle valve controlling said engine, hydraulically actuated brakes for slowing down and stopping said vehicle, a single hydraulic system including a single master cylinder having a piston, a single foot operated pedal operatively connected to said piston for creating pressure therein, a control cylinder having a hydraulically actuated piston operatively connected to said valve for controlling the same, hydraulic pressure transmitting connections interconnecting said master cylinder, said control cylinder and said brakes for constant transmission of hydraulic pressure therebetween, two stage spring means associated with said control cylinder and third stage spring means associated with said brakes, said spring means adapted to resist yieldingly hydraulic pressure in said system and thus to create three pressure stages therein offering three degrees of pressure to the movement of said pedal during one full pressure creating stroke thereof, said valve being adapted to be operated for controlling the engine during the first pressure stage effected by said pedal in the first portion of its travel, said valve being further adapted to be brought into its idling position during the second pressure stage effected by said pedal in the second portion of its travel, and said brakes being adapted to be operated during the third pressure stage effected by said pedal in the third portion of its travel.

19. In a vehicle having an engine, a throttle valve controlling said engine, a crank member having a predetermined travel and operatively connected to said valve for actuating the same, said crank member being adapted to be opening said valve during the first portion of its travel and to be closing said valve by bringing the same back to the original idling position thereof during the second portion of its travel in the same general direction, and means adapted to slow down the response of said throttle valve to the movements of said crank member in the sudden application thereof.

ELI E. HAYES.